United States Patent
Tsai et al.

(10) Patent No.: US 11,366,313 B2
(45) Date of Patent: Jun. 21, 2022

(54) HEAD-MOUNTED DISPLAY DEVICE

(71) Applicant: HTC Corporation, Taoyuan (TW)

(72) Inventors: Meng-Che Tsai, Taoyuan (TW); Kuei-Chun Liu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 421 days.

(21) Appl. No.: 16/538,837

(22) Filed: Aug. 13, 2019

(65) Prior Publication Data

US 2021/0048667 A1 Feb. 18, 2021

(51) Int. Cl.
G02B 27/14 (2006.01)
G02B 27/00 (2006.01)
G02B 3/08 (2006.01)
G06F 3/01 (2006.01)
G06F 1/16 (2006.01)
G02F 1/29 (2006.01)

(52) U.S. Cl.
CPC ........... G02B 27/0025 (2013.01); G02B 3/08 (2013.01); G02F 1/29 (2013.01); G06F 1/163 (2013.01); G06F 3/013 (2013.01)

(58) Field of Classification Search
CPC ......... G02B 27/0025; G02B 3/08; G02F 1/29; G06F 1/163; G06F 3/013
USPC ................... 359/315, 630; 345/7–9
See application file for complete search history.

(56) References Cited

FOREIGN PATENT DOCUMENTS

| CN | 1161087 | 10/1997 | |
|---|---|---|---|
| CN | 106249430 | 12/2016 | |
| CN | 206773301 | 12/2017 | |
| CN | 105593745 | 3/2018 | |
| CN | 209117975 | 7/2019 | |
| TW | 201510572 | 3/2015 | |
| WO | WO-9605532 A1 * | 2/1996 | ......... G02B 27/0172 |
| WO | 2011163668 | 12/2011 | |

OTHER PUBLICATIONS

"Office Action of Taiwan Counterpart Application," dated Nov. 6, 2019, p. 1-p. 8.
"Office Action of China Counterpart Application", dated Mar. 1, 2022, p. 1-p. 11.

* cited by examiner

*Primary Examiner* — William Choi
(74) *Attorney, Agent, or Firm* — JCIPRNET

(57) ABSTRACT

A head-mounted display device including a body, a display element, and two lens groups is provided. The display element is disposed on the body and is adapted to provide an image beam. The two lens groups are disposed on a transmission path of the image beam. Each the lens group includes a plurality of lenses, wherein one of the lenses has an astigmatism surface on at least one side of the display element. The astigmatism surface is non-rotationally symmetrical, and the image beam has astigmatic aberration after passing through the astigmatism surface.

17 Claims, 6 Drawing Sheets

HEAD-MOUNTED DISPLAY DEVICE

BACKGROUND

Technical Field

The present invention generally relates to an electronic device, in particular, to a head-mounted display device.

Description of Related Art

As the technology industry is increasingly developed, the types, functions and usage modes of electronic devices are becoming more diversified, and wearable electronic devices that are worn directly on the body of a user also appear as needed. There are quite a variety of head-mounted electronic devices. For example, a goggle type head-mounted electronic device is taken for an example. The user can watch three-dimensional images after wearing this type of electronic device, and the images will be changed with the movement of the head of the user, so as to make the user have a strong immersive experience.

However, the images provided by this type of head-mounted electronic device is liable to cause a screen door effect due to the structures of a display element, thereby seriously affecting the immersive experience of the user during use. Therefore, how to reduce the screen door effect caused by the head-mounted electronic device needs to be researched by those skilled in the art.

SUMMARY OF THE INVENTION

The present invention provides a head-mounted display device, which reduces a screen door effect caused by head-mounted electronic devices.

The present invention provides a head-mounted display device, including a body, a display element and two lens groups. The display element is disposed on the body, and is configured to provide an image beam. The two lens groups are disposed on a transmission path of the image beam. Each of the lens groups includes a plurality of lenses. One of the lenses has an astigmatism surface on at least one side of the display element. The astigmatism surface is non-rotationally symmetrical, and the image beam has astigmatic aberration after being transmitted through the astigmatism surface.

Based on the above, in the head-mounted display device of the present invention, one of the plurality of lenses of the lens groups has the astigmatism surface on the side away from the display element. The astigmatism surface is non-rotationally symmetrical, and allows the image beam to have the astigmatic aberration after the image beam is transmitted through the astigmatism surface. Therefore, light shielding regions in the display element are unable to form images in human eyes, thereby reducing the screen door effect caused by the light shielding regions when the user observes the images provided by the head-mounted display device with eyes.

In order to make the aforementioned and other objectives and advantages of the present invention comprehensible, embodiments accompanied with figures are described in detail below.

DESCRIPTION OF THE EMBODIMENTS

Figure 1:
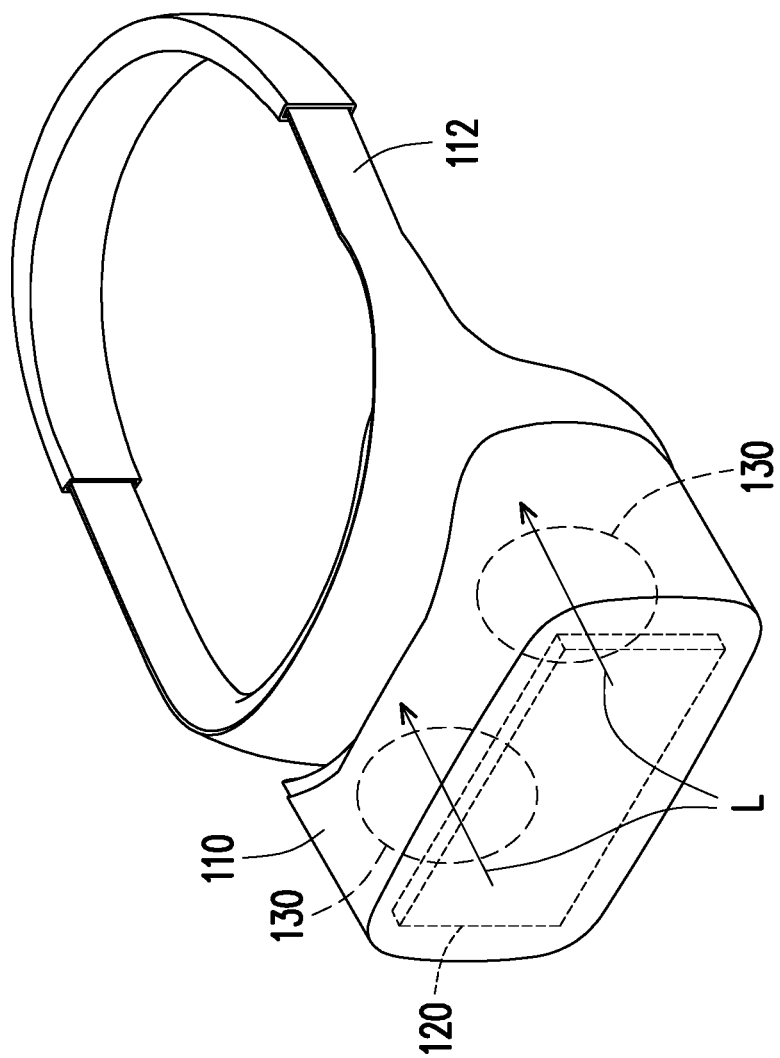
FIG. 1 is a three-dimensional schematic diagram of a head-mounted display device according to one embodiment of the present invention.

FIG. 1 is a three-dimensional schematic diagram of a head-mounted display device according to one embodiment of the present invention. One embodiment of the present invention provides a head-mounted display device 100, which is worn by a user to achieve effects of virtual reality, augmented reality or mixed reality. In the present embodiment, the head-mounted display device 100 includes a body 110, a display element 120, two lens groups 130 and a wearing piece 140. In other embodiments, the types and numbers of all the components are adjusted as required or according to an application situation, and the present invention is not limited thereto.

In the present embodiment, the head-mounted display device 100 includes the body 110, the display element 120 and the two lens groups 130. The body 110 is, for example, a combination of a shell and an optical system. The optical system is carried in the shell, and is, for example, composed of the display element 120 and the two lens groups 130. In the present embodiment, the body 110 includes a wearing piece 112 suitable for being worn on the head of a user, but the present invention is not limited thereto. The display element 120 is a built-in display device or an external portable display device (such as a smart phone), and the present invention is not limited thereto.

Figure 2:
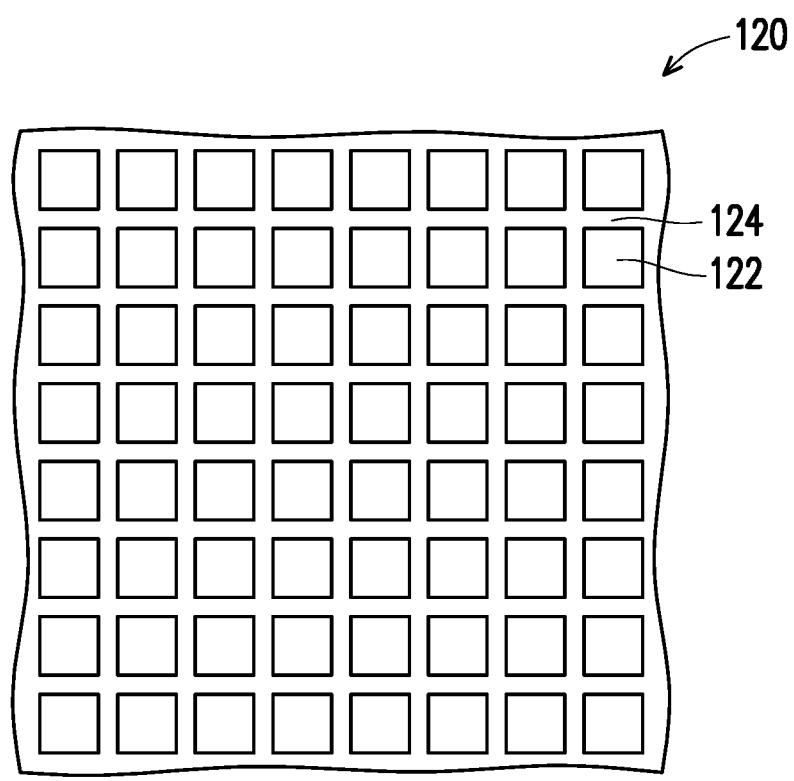
FIG. 2 is a schematic diagram of a part of display surface of a display element of FIG. 1.

FIG. 2 is a schematic diagram of a part of display surface of a display element of FIG. 1. Referring to FIGS. 1 and 2, the display element 120 is disposed on the body 110, and is configured to provide an image beam L. The type of the display element 120 is adjusted according to applications of the head-mounted display device 100 to a virtual reality system, an augmented reality system or a mixed reality system. The optical system includes the two lens groups 130 and other optical elements which are configured to change a light path of the display element 120, such as a lens, a light guide piece or a prism, and the present invention is not limited thereto. In the present embodiment, the display element 120 includes a plurality of arrayed display pixels 122, and a plurality of light shielding regions 124 configured to separate the display pixels 122.

The two lens groups 130 are disposed on a transmission path of the image beam L. Each of the lens groups 130 includes a plurality of lenses. At least one of the lenses has an astigmatism surface on the side away from the display element 120. At least one of the lenses has a Fresnel surface on the side close to the display element 120.

Figure 3:
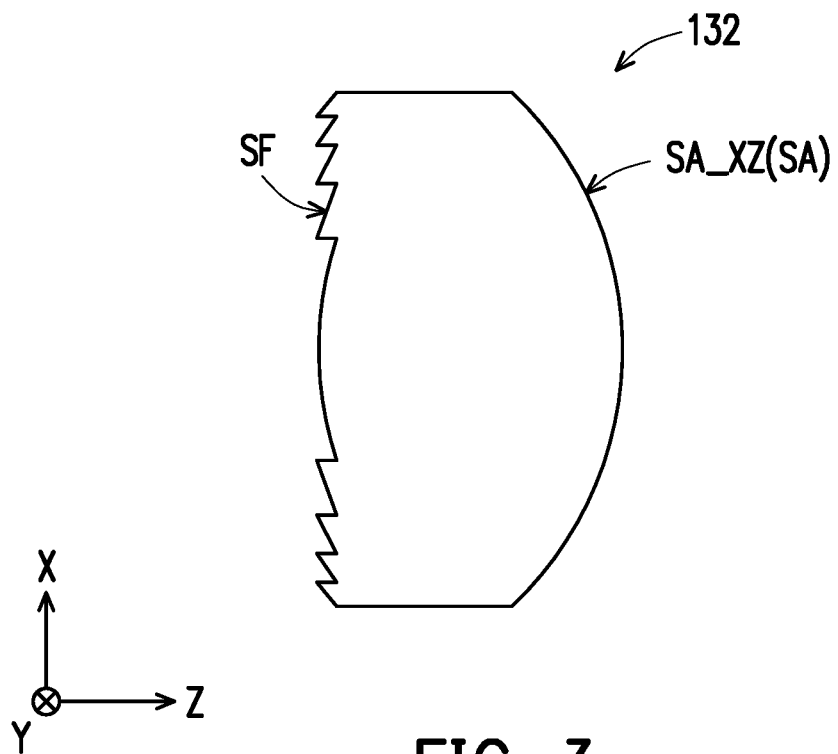
FIG. 3 is a side schematic diagram of a part of lens groups of FIG. 1 on a YZ plane.
Figure 4:
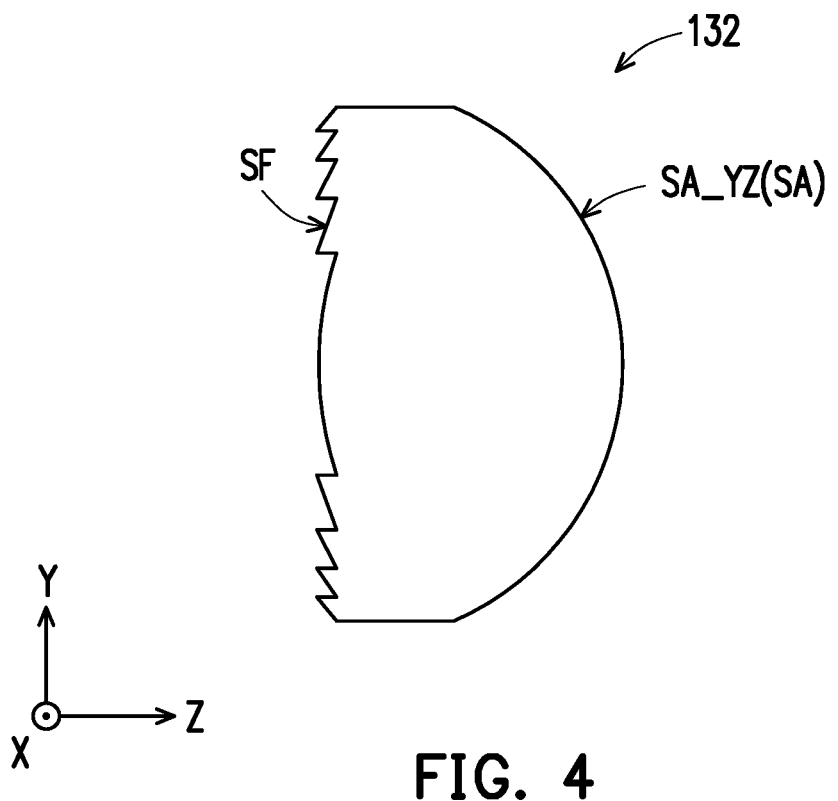
FIG. 4 is a side schematic diagram of a part of lens groups of FIG. 1 on an XZ plane.
Figure 5:
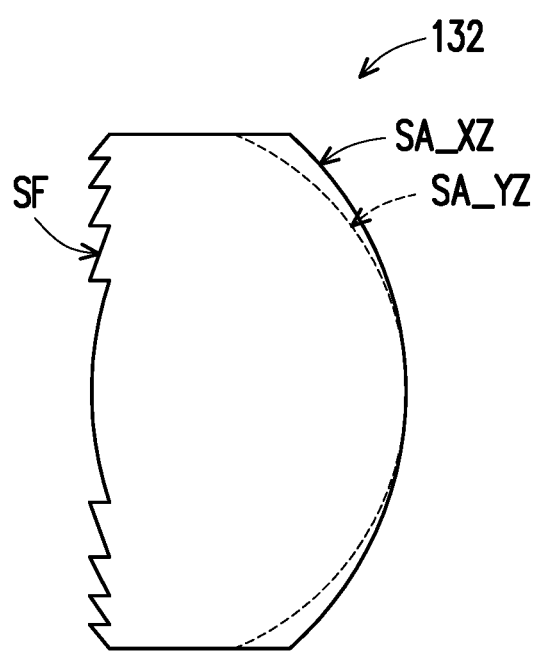
FIG. 5 is a side schematic diagram of superposition of FIG. 3 and FIG. 4.

FIG. 3 is a side schematic diagram of a part of lens groups of FIG. 1 on a YZ plane. FIG. 4 is a side schematic diagram of a part of lens groups of FIG. 1 on an XZ plane. FIG. 5 is a side schematic diagram of superposition of FIG. 3 and FIG. 4. Referring to FIGS. 1, 3 and 5, for example, in the present embodiment, each lens group 130 includes a lens 132 having a diopter. In the lens 132, the side away from the display element 120 is an astigmatism surface SA, and the side close to the display element 120 is a Fresnel surface SF. In other words, in the present embodiment, the lens 132 has both the astigmatism surface SA and the Fresnel surface SF, but the present invention is not limited thereto. In some embodiments, the astigmatism surface SA and the Fresnel surface SF are also respectively disposed on different lenses. For example, in the present embodiment, the Fresnel surface SF and the astigmatism surface SA are respectively a light entering surface and a light exiting surface of the lens 132.

The astigmatism surface SA is a non-rotationally symmetrical curved surface, used as the light exiting surface, and allows the image beam L to have astigmatic aberration after the image beam is transmitted through the astigmatism surface SA. Specifically, a transversal curvature of the astigmatism surface SA on a plane parallel to a plane formed by an X direction and a Z direction (the astigmatism surface SA_XZ as shown in FIG. 3) is different from a transversal curvature on a plane parallel to a plane formed by a Y direction and a Z direction (the astigmatism surface SA_YZ as shown in FIG. 4), thereby forming a curvature difference as shown in FIG. 5. For example, the astigmatism surface SA is, for example, an ellipsoid surface. The above X direction, Y direction and Z direction are perpendicular to one another, and the image beam L (as shown in FIG. 1) is transmitted along a direction parallel to the Z direction.

Therefore, the astigmatic aberration occurs due to the asymmetry of the astigmatism surface SA after the image beam L is transmitted through the astigmatism surface SA, so that an image watched by the user is slightly blurred to reduce the imaging effect of the light shielding regions 124 (see FIG. 2) in the display element 120 in human eyes. In other words, the light shielding regions 124 in the display element 120 are unable to form images in the human eyes by light blurriness generated by the light scattering effect of the above images. In this way, the screen door effect caused by the light shielding regions 124 when the user observes the images provided by the head-mounted display device 100 is reduced.

On another aspect, the Fresnel surface SF is rotationally symmetric, and is used as the light entering surface, which decreases the volume of the entire lens groups 130. The Fresnel surface SF is disposed in the lens 132 having the astigmatism surface SA. However, in other embodiments, the Fresnel surface SF is also disposed in other lenses, and the present invention is not limited thereto.

Figure 6:
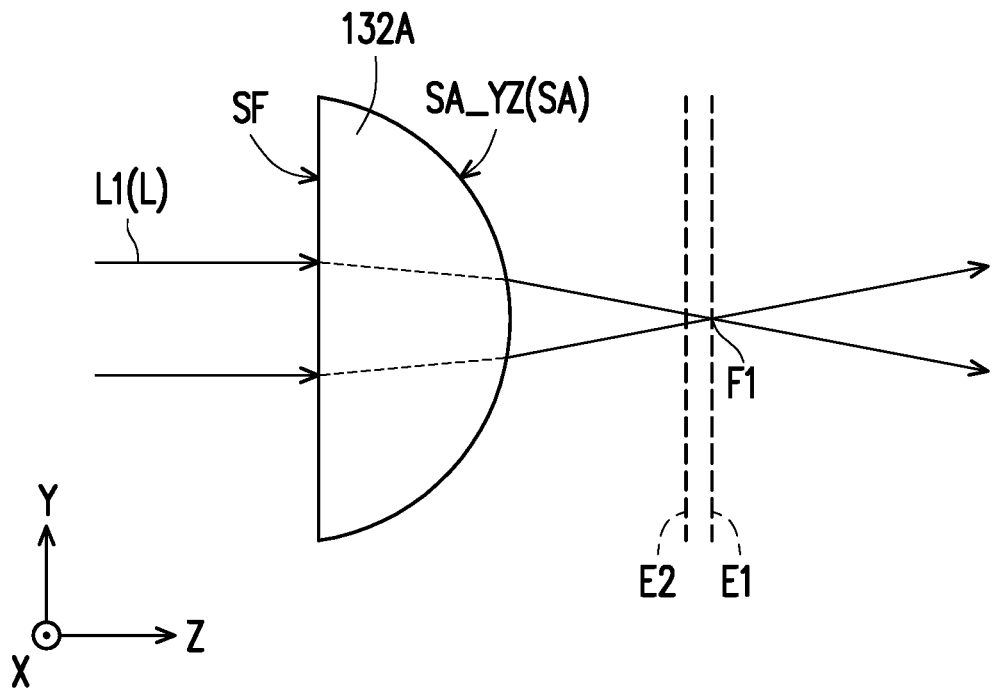
FIG. 6 is a light path schematic diagram of a part of lens groups on a YZ plane according to another embodiment.
Figure 7:
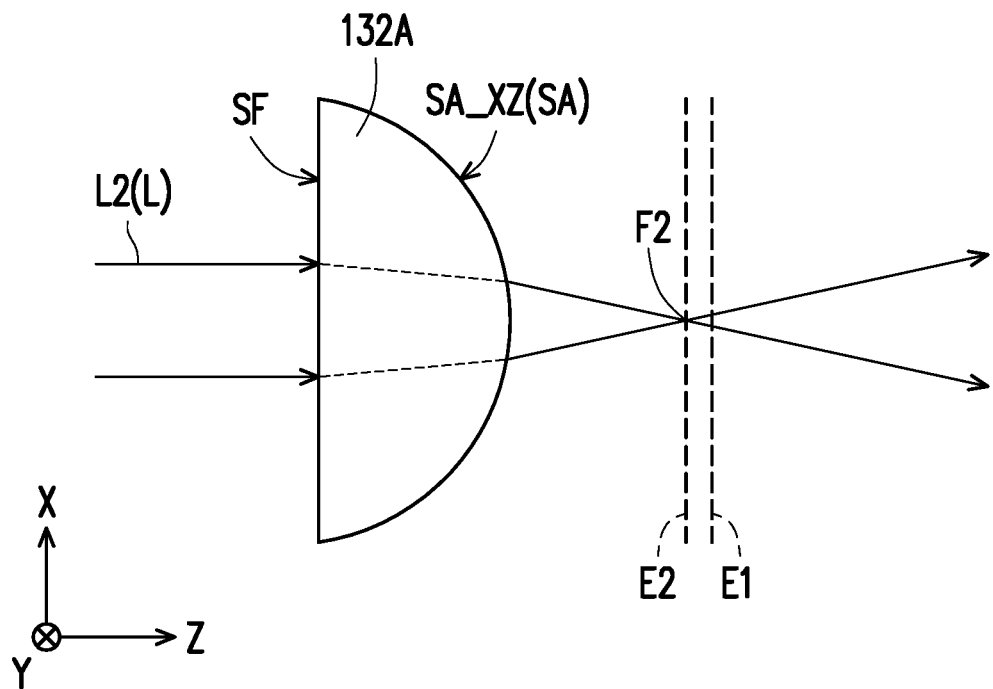
FIG. 7 is a light path schematic diagram of the part of lens groups of FIG. 6 on an XZ plane.
Figure 8:
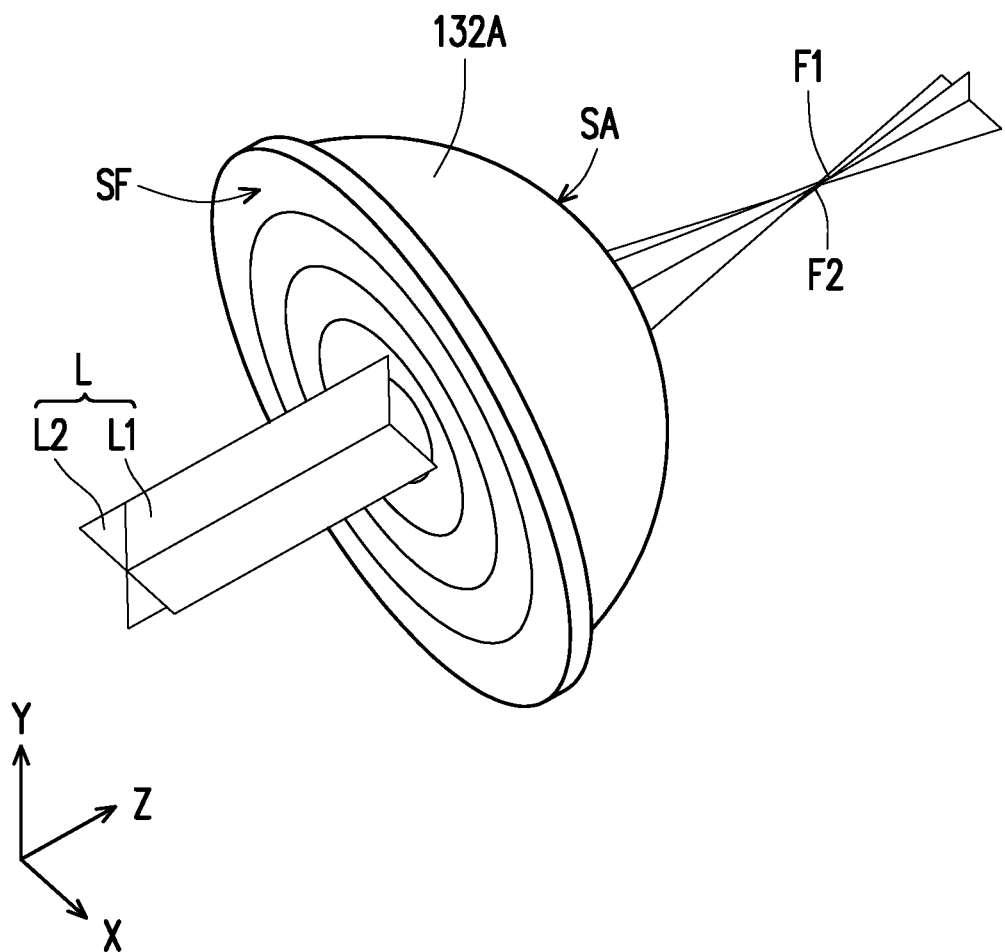
FIG. 8 is a three-dimensional light path schematic diagram of the part of lens groups of FIG. 6.

FIG. 6 is a light path schematic diagram of a part of lens groups on a YZ plane according to another embodiment. FIG. 7 is a light path schematic diagram of a part of lens groups of FIG. 6 on an XZ plane. FIG. 8 is a three-dimensional light path schematic diagram of a part of lens groups of FIG. 6. Referring to FIGS. 1, 6 and 8, a lens 132A illustrated in the present embodiment is at least applied to the two lens groups 130 illustrated in the embodiment of FIG. 1, so application to the two lens groups 130 illustrated in the embodiment of FIG. 1 will be described below, but the present invention is not limited thereto. In the present embodiment, after the image beam L provided by the display element 120 is transmitted through the astigmatism surface SA, the transversal curvature of the astigmatism surface SA on the plane parallel to the plane formed by the X direction and the Z direction is different from the transversal curvature on the plane parallel to the plane formed by the Y direction and the Z direction, so an imaging focal plane of one portion, transmitted through the astigmatism surface SA, of the image beam L is different from an imaging focal plane of another portion transmitted through the astigmatism surface SA.

Specifically, in the present embodiment, the transversal curvature of the astigmatism surface SA on the plane parallel to the plane formed by the Y direction and the Z direction is greater than the transversal curvature on the plane parallel to the plane formed by the X direction and the Z direction. Therefore, after the image beam L is transmitted through the astigmatism surface SA, a focal length of a focal point F1 formed by a part of an image beam L1, parallel to the Y direction, on an imaging focal plane E1 is greater than a focal length of a focal point F2 formed by a part of image beam L2, parallel to the X direction, on an imaging focal plane E2, as shown in FIGS. 6 to 8. In this way, the astigmatic aberration occurs due to the asymmetry of the astigmatism surface SA after the image beam L is transmitted through the astigmatism surface SA, so that the light shielding regions 124 in the display element 120 are unable to form images in the human eyes, thereby reducing the screen door effect caused by the light shielding regions 124 when the user observes the images provided by the head-mounted display device 100.

In some embodiments, the lens having the astigmatism surface is a liquid crystal lens. Specifically, the lens having the astigmatism surface includes a liquid crystal layer and two electrode structures configured to control different axial directions of the liquid crystal layer. Therefore, a liquid crystal material in the liquid crystal layer is enabled to have different refractive indexes in different directions by controlling the modulation of the two electrode structures, and then different equivalent transversal curvatures are generated in two mutually perpendicular directions. In this way, the astigmatic aberration occurs due to the asymmetry of the astigmatism surface after the image beam is transmitted through the astigmatism surface, so that the light shielding regions in the display element are unable to form images in the human eyes, thereby reducing the screen door effect caused by the light shielding regions when the user observes the images provided by the head-mounted display device.

In addition, in some embodiments, a lens having an astigmatism surface is a liquid lens. The liquid lens is, for example, composed of liquid and a polymer film coating the liquid. The liquid lens is suitable for changing the shape by controlling the liquid and the polymer film. Specifically, the liquid lens includes a control element and at least one electrode. The control element is connected to the liquid lens through the at least one electrode. In one embodiment, the control element controls the liquid lens by the at least one electrode according to a picture displayed by the display element to generate the astigmatism surface. In another embodiment, the head-mounted display device also includes a sensor configured to sense an eyeball movement state of the user. The control element then controls the liquid lens according to the eyeball movement state sensed by the sensor. In other words, in the present embodiment, the astigmatism surface generated by the liquid lens is adaptively slightly adjusted to an optimal effect as the human eyes move. In this way, the user has a better visual experience.

Furthermore, in some embodiments, the lens having the astigmatism surface is a multi-focal lens. Therefore, the formed astigmatism surface forms a plurality of astigmatism surfaces with a plurality of different optical conditions in a plurality of different regions on the multi-focal lens. In other words, the astigmatism surface on the multi-focal lens is composed of a plurality of different astigmatism regions, and the optical conditions of these astigmatism regions are different from one another. Therefore, in the present embodiment, the astigmatism surface generated by the multi-focal lens adaptively uses the astigmatism region with the best effect as the human eyes move. In this way, the user has a better visual experience.

In addition, in all of the above embodiments, the lens having the astigmatism surface further rotates, moves or tilts relative to the display element. For example, the head-mounted display device also includes a sensor and a control element. The sensor is suitable for sensing an eyeball movement of the user, and the control element then controls the lens having the astigmatism surface according to the eyeball movement state sensed by the sensor. Therefore, when the user uses the head-mounted display device, the astigmatism surface adaptively slightly adjusts the position or angle of the astigmatism surface to an optimal position or angle as the human eyes move. In this way, the user has a better visual experience.

Based on the above, in the head-mounted display device of the present invention, one of the plurality of lenses of the lens groups has the astigmatism surface on the side away from the display element. The astigmatism surface is non-rotationally symmetrical, and allows the image beam to have the astigmatic aberration after the image beam is transmitted through the astigmatism surface. Therefore, the light shielding regions in the display element is unable to form images in human eyes, thereby reducing the screen door effect caused by the light shielding regions when the user observes the images provided by the head-mounted display device.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A head-mounted display device, comprising:
a body;
a display element, disposed on the body and adapted to provide an image beam; and
two lens groups, disposed on a transmission path of the image beam, each of the lens groups comprising a plurality of lenses wherein one of the lenses has an astigmatism surface on at least one side of the display element, the astigmatism surface is non-rotationally symmetrical, and the image beam has astigmatic aberration after passing through the astigmatism surface,
wherein the lens having the astigmatism surface is a multi-focal lens.

2. The head-mounted display device according to claim 1, wherein an imaging focal plane of one portion, transmitted through the astigmatism surface, of the image beam is different from an imaging focal plane of another portion transmitted through the astigmatism surface.

3. The head-mounted display device according to claim 1, wherein a transversal curvature of the astigmatism surface on a plane parallel to a plane formed by an X direction and a Z direction is different from a transversal curvature on a plane parallel to a plane formed by a Y direction and a Z direction, the X direction, the Y direction, and the Z direction are perpendicular to one another, and the image beam is transmitted along a direction parallel to the Z direction.

4. The head-mounted display device according to claim 1, wherein the astigmatism surface is a curved surface.

5. The head-mounted display device according to claim 1, wherein the lens having the astigmatism surface has a diopter.

6. The head-mounted display device according to claim 1, wherein the lens having the astigmatism surface has a Fresnel surface on the side close to the display element.

7. The head-mounted display device according to claim 1, wherein another one of the plurality of lenses has a Fresnel surface on the side close to the display element.

8. The head-mounted display device according to claim 1, wherein the display element comprises a plurality of arrayed display pixels and a plurality of light shielding regions configured to separate the plurality of display pixels.

9. The head-mounted display device according to claim 1, wherein the lens having the astigmatism surface is a liquid crystal lens.

10. The head-mounted display device according to claim 9, wherein the lens having the astigmatism surface comprises a liquid crystal layer and two electrode structures configured to regulate and control different axial directions of the liquid crystal layer, and transversal curvatures of the astigmatism surface in two mutually perpendicular directions are formed by modulating the liquid crystal layer by the two electrode structures respectively.

11. The head-mounted display device according to claim 1, wherein the lens having the astigmatism surface is a liquid lens.

12. The head-mounted display device according to claim 11, wherein the lens having the astigmatism surface is composed of liquid and a polymer film, and the lens is suitable for changing a shape by controlling the liquid and the polymer film.

13. The head-mounted display device according to claim 11, wherein the lens having the astigmatism surface comprises a control element and at least one electrode, the control element is connected to the lens through the at least one electrode, and the control element controls the lens by the at least one electrode according to a picture displayed by the display element to generate the astigmatism surface.

14. The head-mounted display device according to claim 13, further comprising a sensor, adapted to sense an eyeball movement, wherein the control element controls the lens according to the eyeball movement sensed by the sensor.

15. The head-mounted display device according to claim 1, wherein the astigmatism surface of the lens has a plurality of different astigmatism regions.

16. The head-mounted display device according to claim 1, wherein the lens having the astigmatism surface may rotate, move, or tilt relative to the display element.

17. The head-mounted display device according to claim 16, further comprising a sensor and a control element, wherein the sensor is suitable for sensing an eyeball movement, and the control element controls the lens having the astigmatism surface according to the eyeball movement sensed by the sensor.

* * * * *